(12) United States Patent
Walther et al.

(10) Patent No.: US 9,105,102 B1
(45) Date of Patent: Aug. 11, 2015

(54) METHOD FOR PROCESSING RADIOGRAPHIC IMAGES OF RAPIDLY MOVING OBJECTS SUCH AS SHAPED CHARGE JET PARTICLES

(71) Applicants: Joseph R. Walther, Arlington, VA (US); James E. Painter, Gaithersburg, MD (US)

(72) Inventors: Joseph R. Walther, Arlington, VA (US); James E. Painter, Gaithersburg, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 207 days.

(21) Appl. No.: 14/043,078

(22) Filed: Oct. 1, 2013

(51) Int. Cl.
    *G06K 9/00* (2006.01)
    *G06T 7/20* (2006.01)
    *G06K 9/46* (2006.01)
    *H04N 5/228* (2006.01)

(52) U.S. Cl.
    CPC .............. *G06T 7/204* (2013.01); *G06K 9/4609* (2013.01); *G06K 9/4652* (2013.01)

(58) Field of Classification Search
    USPC ......... 382/100, 103, 106–107, 128, 132, 162, 382/168, 173, 181, 194, 199, 203, 209, 232, 382/254, 274–276, 291, 305, 312, 260, 172, 382/261; 348/68, 208.13
    See application file for complete search history.

(56) References Cited

U.S. PATENT DOCUMENTS

| | | | | |
|---|---|---|---|---|
| 7,450,757 B2* | 11/2008 | Kato et al. | ..................... | 382/172 |
| 7,702,174 B2* | 4/2010 | Kato et al. | ..................... | 382/260 |
| 7,899,256 B2* | 3/2011 | Fedorovskaya et al. | ...... | 382/199 |
| 8,417,050 B2* | 4/2013 | Kisilev et al. | ................. | 382/261 |
| 2013/0163843 A1* | 6/2013 | Park et al. | ..................... | 382/132 |

OTHER PUBLICATIONS

Blische, H.J., Simmons, B.M., "A Method for Reducing Data From Radiographs of Shaped Charge Jets." Ballistic Research Lab, Aberdeen Proving Ground, Maryland. Technical Report ARBRL-TR-023330. Jun. 1981.

(Continued)

*Primary Examiner* — Seyed Azarian
(74) *Attorney, Agent, or Firm* — Howard Kaiser

(57) ABSTRACT

According to exemplary inventive practice, a region containing an object of interest, such as a jet particle of a shaped charge, is extracted from a raw radiographic image. This regional image is filtered, and its pixel intensity range is rescaled to increase contrast. The filtered, re-contrasted image is converted to a binary image by setting a threshold pixel intensity, and assigning a binary pixel intensity of either 1 or 0 to each pixel, depending on its scaled pixel intensity versus the threshold pixel intensity. The binary image is inverted and filtered. Contiguities of binary-one pixels to binary-zero pixels in the inverted, filtered binary image provide the basis for delineating the outline of the object. The object's outline is superimposed on the object's portrayal in the original regional image, to assess the degree of match. Various threshold pixel intensities can be applied in plural iterations until a sufficient match is obtained.

17 Claims, 12 Drawing Sheets

(56) References Cited

OTHER PUBLICATIONS

Summers, R.L., Wright, K.C., "Computer-Aided Analysis of Flash X-Ray Films." Ballistic Research Lab, Aberdeen Proving Ground, Maryland. Technical Report BRL-TR-3393. Sep. 1992.

Pham, J.D., Baker, E.L., DeFisher, S., "Shaped Charge Jet Flash Radiograph Digitization." U.S. Army Armament Research, Development and Engineering Center, Picatinny, New Jersey. Technical Report ARAET-TR-05013. Sep. 2005.

Himanshu Shekhar, "Theoretical Modelling of Shaped Charges in the Last Two Decades (1990-2010): A Review," Central European Journal of Energetic Materials, vol. 9, No. 2, 2012, pp. 155-185.

* cited by examiner

METHOD FOR PROCESSING RADIOGRAPHIC IMAGES OF RAPIDLY MOVING OBJECTS SUCH AS SHAPED CHARGE JET PARTICLES

BACKGROUND OF THE INVENTION

The present invention relates to photographic (e.g., radiographic) imaging, more particularly to methods, systems, and computer programs for processing or analyzing photographic images, for instance radiographic images of fast-moving objects such as shaped charge jet particles.

A conventional shaped charge device is a weapon designed to concentrate explosive energy in a focused manner. Detonation of a shaped charge results in a high-velocity jet of metal particles in a particular direction, some of which may be moving at hypersonic speeds. Notable are military applications of shaped charge technology as various forms of armor-piercing weaponry.

From a military standpoint, it is important to be able to implement flash radiographic images (e.g., x-ray photographs) to characterize the flight of shaped charge jet particles, and to do so with high degrees of accuracy and completeness. The radiographic image processing involved has much to do with the effectiveness of these characterizations.

The following references, each of which is hereby incorporated herein by reference, are instructive on previous radiographic image processing methods: H. John Blische, B. M. Simmons, "A Method for Reducing Data From Radiographs of Shaped Charge Jets," U.S. Army Ballistic Research Lab, Aberdeen Proving Ground, Md., Technical Report ARBRL-TR-023330, June, 1981; Richard L. Summers, K. C. Wright, "Computer-Aided Analysis of Flash X-Ray Films," U.S. Army Ballistic Research Lab, Aberdeen Proving Ground, Md., Technical Report BRL-TR-3393, September, 1992; James D. Pham, E. L. Baker, S. DeFisher, "Shaped Charge Jet Flash Radiograph Digitization," U.S. Army Armament Research, Development and Engineering Center, Picatinny, N.J., Technical Report ARAET-TR-05013, September, 2005, Himanshu Shekhar, "Theoretical Modelling of Shaped Charges in the Last Two Decades (1990-2010): A Review," Central European Journal of Energetic Materials, Volume 9, Number 2, 2012, pages 155-185.

One previous method for radiographic image processing of shaped charge jet particles requires the user to select digitization points on a jet particle's perimeter by hand. This approach lacks the consistency of any physical basis for choosing these digitization points, and will vary from user to user. Another previous method uses a computer code to choose digitization points automatically, but does not allow for any adjustment or visual verification by the user; in particular, the user has no input into the accuracy of the chosen locations.

Previous radiograph processing methods typically specify a predetermined number of points to be digitized for each jet particle, normally one to eight points depending on the location of the jet particle relative to the tip or lead particle. The geometric coordinates of these points are the principal data used in calculation of a jet particle's volume, length, mass, and velocity. More specifically, the volume characteristics and therefore the mass characteristics (mass is a function of liner density and volume) of the jet particle are determined from the summation of truncated conical segments created by these digitized points. These known methods give an approximation of the jet particle area, as the particle boundary is estimated by the line segment that connects two adjacent digitized points. As the number of digitized points is increased, the lengths of the corresponding line segments tend to zero, and hence the estimated boundary tends to greater exactitude.

Since shaped charge weapons are usually designed with a nearly optimized built-in standoff distance upon detonation, previous researchers have not been concerned with the full three-dimensional characterization of the jet. The axial velocity of the jet particles is the primary contributor to the penetration of the weapon, and the axial velocity measured in a two-dimensional image will be almost exactly the same as if performed in three-space. For this reason, previous methods do not account for vector-based relative motion. Nevertheless, this traditional lack of consideration of three-dimensional characteristics of jet particle flight neglects important phenomena of shaped charge weapons.

SUMMARY OF THE INVENTION

In view of the foregoing, an object of the present invention is to provide an improved methodology for processing radiographic images of high velocity objects such as shaped charge jet particles.

The present invention can be practiced with respect to practically any photographic image, and can be embodied, for instance, as a computer-implemented method, a system or apparatus including a computer, or a computer program product. Photographic processing according to the present invention is usually performed using a computer and a computer display. Digital graphic images having pixels are processed by the computer and are viewed on the computer display.

According to exemplary inventive practice, the inventive practitioner obtains a multi-intensity photographic image containing an object. This working image may have been taken, for instance, from a larger photographic image. The multi-intensity image (e.g., color image or grayscale image), is characterized by pixels falling within the gamut between lowest intensity (black pixel) and highest intensity (white pixel).

Early in the present invention's photographic processing, an inventive practitioner refines (e.g., filters and/or re-contrasts) the multi-intensity photographic image containing the object. Filtering of the image may involve, for instance, use of a Wiener filter and/or a median filter. Re-contrasting of the image may involve, for instance, increasing the contrast via rescaling (e.g., broadening) of the intensity range. For example, the image can be re-contrasted to span a continuum between zero-intensity (black) and one-intensity (white).

The practitioner renders the refined multi-intensity image in binary-intensity form (e.g., as a black-and-white image). The binary-intensity image is characterized by pixels that are on opposite ends of the pixel intensity scale. The binary-intensity image has only two possible values for each pixel; each pixel is either lowest intensity (black pixel) or highest intensity (white pixel). Generation of the binary-intensity image includes establishing a threshold pixel intensity with respect to the refined multi-intensity image. The threshold pixel intensity for the refined multi-intensity image can be established using any of a variety of conventional mathematical techniques, such as involving averaging of pixel intensities in the image.

Depending on the inventive embodiment, the threshold pixel intensity may be implemented so that every pixel above the threshold becomes or remains white, and every pixel below the threshold becomes or remains black; conversely, the threshold pixel intensity may be implemented so that every pixel above the threshold becomes or remains black, and every pixel below the threshold becomes or remains white. According to some inventive embodiments, the practitioner obtains a binary-intensity image and inverts it so that the black pixels become white pixels, and the white pixels become black pixels. In exemplary inventive practice, the practitioner filters the binary-intensity image.

The practitioner then generates a black-white interface image, doing so using the (e.g., filtered and/or inverted) binary-intensity image. The black-white interface image defines the periphery of the object in terms of the black-versus-white interfacial construct of the (e.g., filtered) binary-intensity image. More specifically, in the black-white interface image, the object's periphery is delineated by adjacencies between black pixels and white pixels in the binary-intensity image. Geometrically, the peripheral delineation of the object describes a closed planar curvilinear shape.

Viewing the display, the practitioner superposes the object's peripheral delineation as depicted in the black white interface image, upon the object as depicted in the original, unrefined multi-intensity image. In this manner, a comparison is made to determine the degree of congruency between the peripheral object depiction and the original object depiction. Exercising his/her judgment, the practitioner decides whether there is sufficient congruency to meet the requirements of the analytical undertaking; if not, the practitioner repeats the iterative steps. Each repetition is characterized by establishment of a different threshold pixel intensity, in the step of generating the binary-intensity image.

That is, in each repetition, the practitioner: generates the binary-intensity image anew by establishing a threshold pixel intensity that differs from the previous threshold pixel intensity, possibly inverting and/or filtering the binary-intensity image; generates a black-white interface image; and, compares the black-white interface image to the original multi-intensity image. The practitioner may perform this series of steps just once, or may perform this series of steps iteratively until, in the practitioner's judgment, the object periphery of the black-white interface image is sufficiently congruous with the object as originally displayed. The object periphery that is selected by the practitioner can then be used for further analysis (e.g., computer analysis) pertaining to the object.

Depending on the inventive embodiment, certain steps of the inventive methodology may be skipped. For instance, the practitioner may dispense with filtration, or re-contrasting, or both filtration and re-contrasting, of the multi-intensity photographic image, and proceed immediately to the generation therefrom of a binary-intensity image. As another example, the practitioner may dispense with inversion, or filtration, or both inversion and filtration, of the binary-intensity image, and proceed immediately to the generation therefrom of a black-white interface image.

The terms "photograph" and "photographic image" are used herein to broadly refer to any image created by recording visible light or other electromagnetic radiation, for instance chemically recording electromagnetic radiation using a light-sensitive material such as photographic film, or electronically recording electromagnetic radiation using an image sensor. The terms "radiograph" and "radiographic image" are used synonymously herein to broadly refer to any photographic image produced using any form of electromagnetic radiation other than visible light, such as X-rays or gamma rays.

Important aspects of the present invention are disclosed by the present inventors in the following unpublished U.S. Navy technical report that they co-authored, hereby incorporated herein by reference: Joseph R. Walther and James E. Painter, "Automated Digital Flash Radiograph Analysis and Three-Dimensional Characterization of Shaped Charge Jets," NSWCCD Technical Report NSWCCD-66-TR-2011/35, Naval Surface Warfare Center, Carderock Division (NSWCCD), limited distribution (DoD and DoD contractors only—critical technology), not yet indexed in the NSWCCD technical library (approved on or about 9 Oct. 2012 for indexing in the NSWCCD technical library).

The present invention uniquely features, inter alia, the transformation of flash radiograph images into matrix and binary forms, and the manipulation of these forms. Certain known image-processing techniques are incorporated in the present invention's new methodology. A significant novelty is the present invention's capability of adjusting image threshold values when creating a binary representation of an object (e.g., a jet particle), thus enabling the user to manually adjust the point and/or edge detection. This inventive adjustment is essentially based on the physical characteristics of the flash radiograph image, albeit a small percent of human error may be introduced because practitioner judgment is necessitated in the adjustment. The present inventors believe that edge/point detection according to the present invention is superior to edge/point detection according to the previous methods.

The present invention can be practiced in multifarious applications with respect to practically all kinds of photographic images. A noteworthy area of inventive application involves the processing of radiographic images of particular objects, especially objects traveling at high velocities. Inventive practice of radiographic analysis can be efficacious in the characterization of the three-dimensional flight of nearly any high speed object, including but not limited to EFPs, bullets, fragments, spall, etc. Notable are inventive applications involving analysis of radiographs of shaped charge jet particles. Through inventive practice, a digital representation of a flash radiograph of a shaped charge jet in free flight can be analyzed with a high degree of precision.

The present invention addresses, inter alia, a military need to use flash radiographic images to fully and accurately characterize the free flight of shaped charge jet particles in three dimensions. Previous methods may be capable, to some extent, of analyzing orthogonal flash radiographs to describe motion in three-space. Nevertheless, the present inventors' initial focus was three-dimensional characterization of shaped charges; this intent of the present invention from its conception produced a high fidelity tool that can be of great benefit in a variety of applications.

The present invention, as often embodied, affords an appropriate mix of automation and user input to perform necessary steps involving image processing, rectification, and detection, thereby yielding very high fidelity results. For each individual shaped charge jet particle, measurements for volume, length, mass, axial velocity, transverse velocity, and tumble rate (angular velocity) can calculated using the most accurate techniques. The characterizations of transverse and tumble velocities are of particular importance to the U.S. Navy, as shaped charge jet shot lines are relatively long for any ship target.

Exemplary embodiments of inventive practice implement inventive code that automates important tasks in processing and analysis of images such as flash radiographs. The present inventors devised a computer program that they named "Automated Jet Analysis of X-rays" ("AJAX"), a semi-automated program written in MATLAB that performs the necessary processing operations and outputs the relevant jet particle information for further manipulation. Exemplary inventive practice includes filtering and adjustment of images, and performance of thresholding operations. According to some embodiments, techniques for x-ray magnification rectification are then applied to inventive outcomes. What springs forth from exemplary practice of the present invention is a dataset that allows for excellent characterization of the entire shaped charge jet under analysis.

An embodiment of the present invention, including its AJAX code, was tested by studying two example problems concerning free-flight radiographs of identical shaped charge weapons. After the radiographs were inventively processed and analyzed, certain jet characteristics such as velocity, cumulative mass, and cumulative length were measured and compared to previously published work. The experimental results of the present invention were found to accord with the previous findings. Moreover, the present invention may afford greater accuracies and capabilities for computations of radial and tumble velocities of jet particles.

BRIEF DESCRIPTION OF THE DRAWINGS

The present invention will now be described, by way of example, with reference to the accompanying drawings, wherein:

FIG. 7 was obtained via a mathematical averaging technique such as illustrated in FIG. 6.

FIG. 8 corresponds to, and was obtained through inversion and filtration of, the binary image shown in FIG. 7.

DESCRIPTION OF EXEMPLARY EMBODIMENTS OF THE INVENTION

Referring now to the figures, exemplary practice of the present invention determines an optimal representation of the boundary of a shaped charge jet particle. Exemplary inventive embodiments start with a raw radiographic image and perform actions with respect thereto involving extraction of a region of an image, filtration of an image, re-contrasting (e.g., increasing contrast) of an image, conversion of an image to a binary image, inversion of a binary image, matrix definition of pixels, matrix definition of pixel contiguities, and superpositional comparison of an inventively processed image vis-à-vis an original or early version of the image. Each individual jet particle that is selected from a group of jet particles can undergo its own processing steps in accordance with the present invention.

Figure 1:
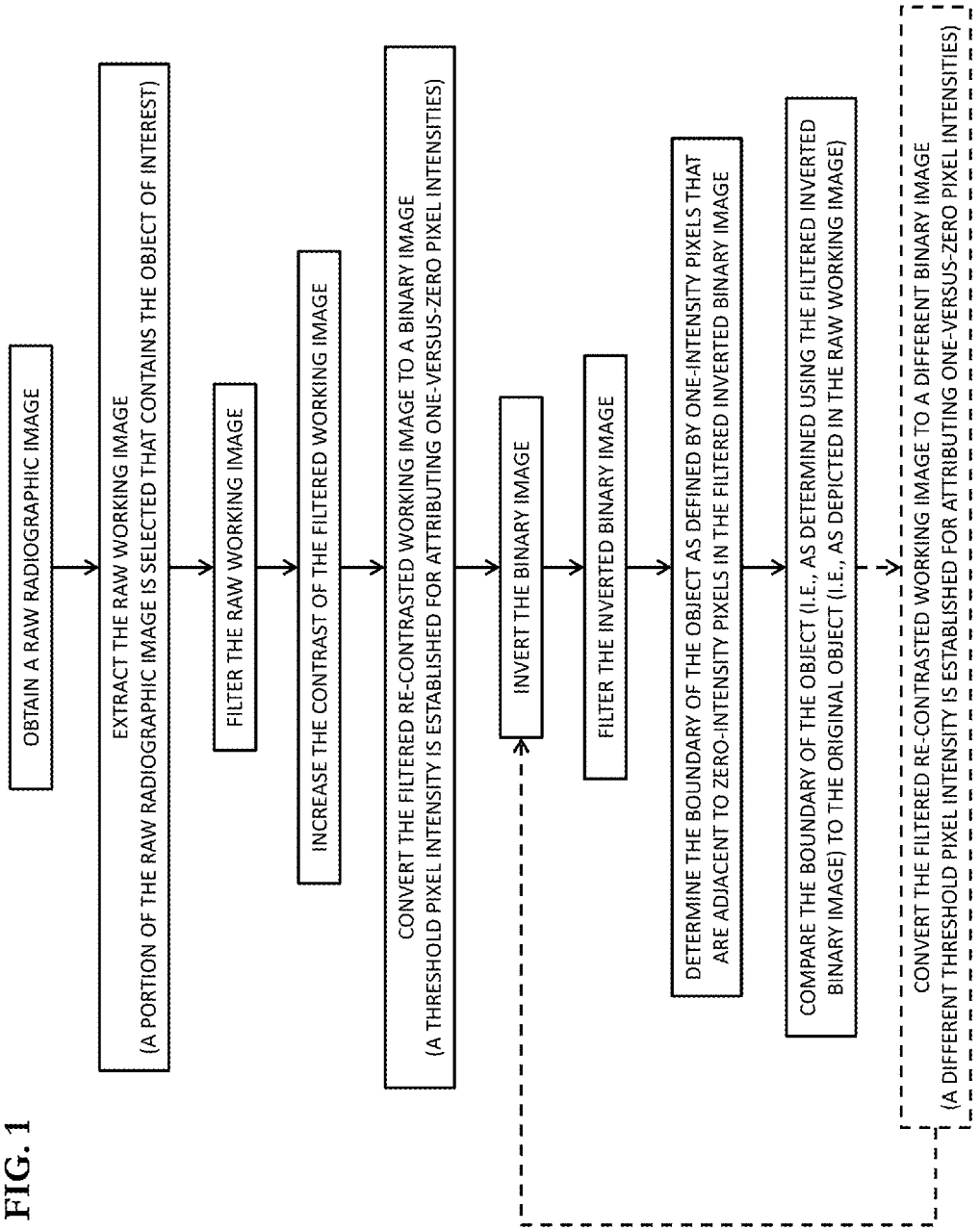
FIG. 1 is a flow diagram illustrating exemplary practice of computer-implemented processing of a radiographic image in accordance with the present invention.
Figure 2:
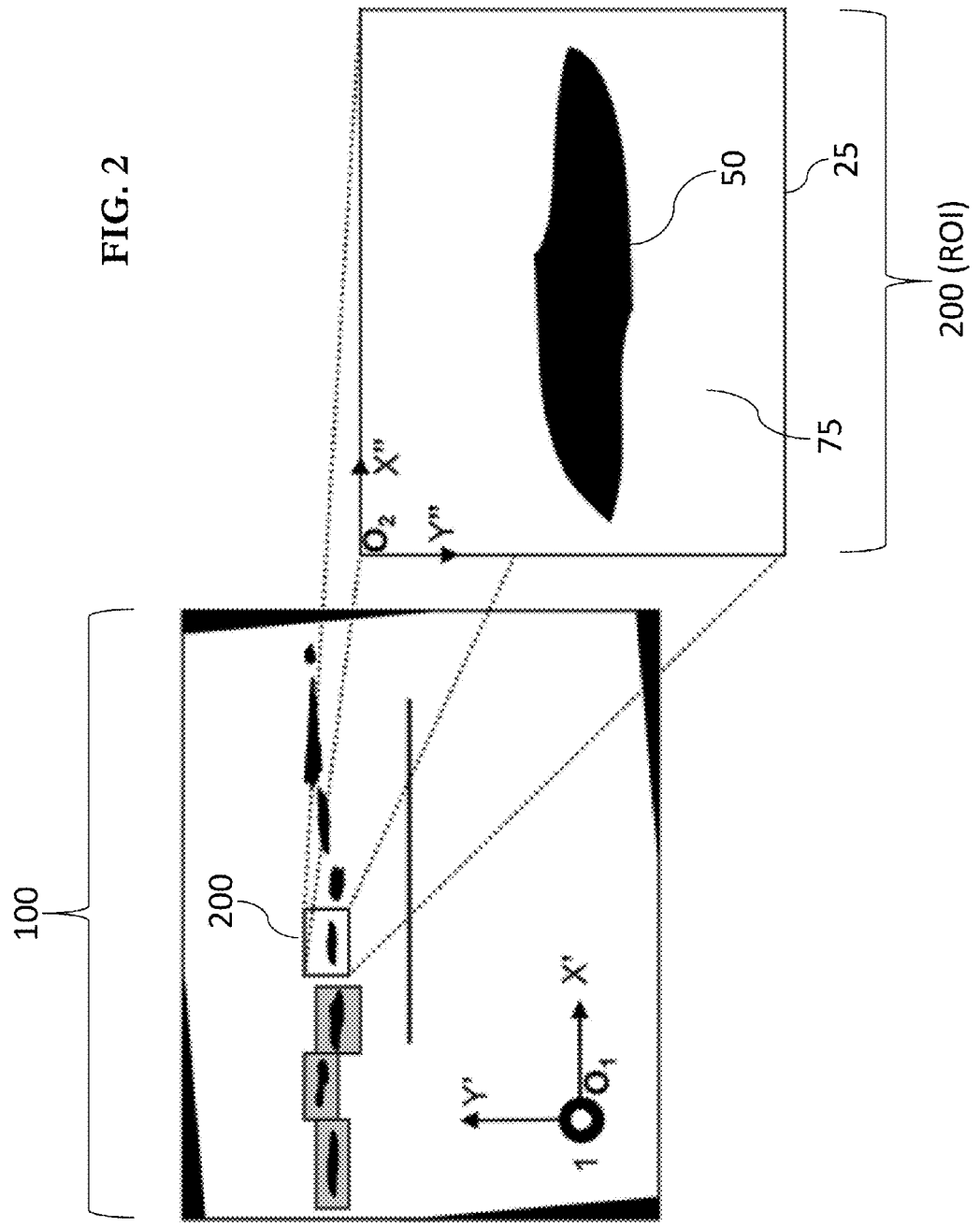
FIG. 2 is a schematic illustrating, by way of example, selection of a region of interest of a raw radiographic computer image for purposes of processing the region of interest in accordance with the present invention.

As shown in FIG. 2, radiographic image 100 is a raw radiographic image that has been slightly transformed from an original raw radiographic image into a workable form having a relevant x-y coordinate system $O_1$. Image 100 portrays several or many shaped charge jet particles 50, depicted in the image foreground against the image background 75. Particle by particle, information can be inventively gathered on the shaped charge jet particles in flash radiograph 100. Starting with radiographic image 100, each region of interest (ROI) containing a jet particle 50 is cropped from the original image 100. Jet particle 50 is then related to the new cropped image coordinate system $O_2$; this becomes the new temporary working image, unprocessed image 200.

Figure 3:
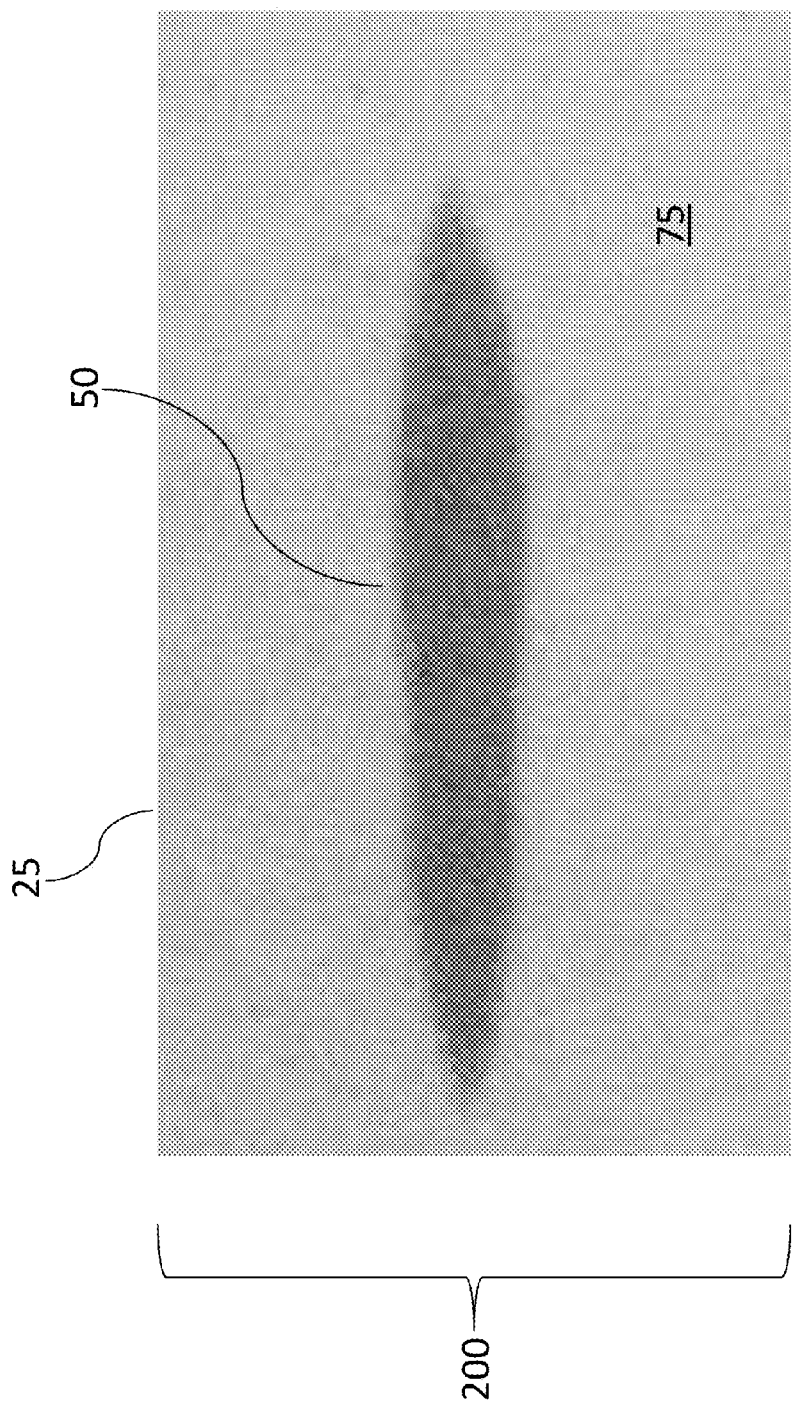
FIG. 3 is an example of a raw radiographic computer image that has been selected, as a region of interest, from a larger radiographic image. The regional image shown in FIG. 3 constitutes the original working image for processing in accordance with the present invention. The object displayed in the foreground of FIG. 3 is a shaped charge jet particle.

The inventive practitioner thus selects regions of interest within the main image 100; each region of interest is delimited as a regional raw image 200 such as shown in FIG. 3. Image 200 is demarcated by a rectangular box (border) 25, and contains a discrete jet particle 50 visible in the foreground of image 200 in contrast to the background 75 of image 200. The particle-by-particle selection approach of exemplary inventive practice ensures that all significant jet particles 50 are evaluated, and that secondary particles or debris of no significance are disregarded. For instance, the AJAX software developed by the present inventors allows the user to select each jet particle 50 within a rectangular box 25, colors the image background 75 of the selected ROI a faint color for recognition purposes, and then moves onto the next jet particle 50. The inventive practitioner continues in this fashion until all jet particles 50 of interest are selected.

Filtering and thresholding operations are performed with respect to each regional image 200 so as to isolate the individual jet particle 50 from the background 75. The filtering and thresholding operations may be performed, for instance, once all jet particles 50 are selected. A most important phase of the present invention's image analysis process is the accurate identification of the jet particle 50's boundary 500 through implementation of the present invention's unique thresholding techniques. The inventive methodology is not a fully automated process, as it involves user interaction with the inventive code. The inventive practitioner exercises threshold adjustment of the jet particle boundary 500, thereby visually verifying that the inventive program has correctly identified the jet particle boundary 500 as precisely as possible.

In order to properly detect the jet particle 50 shadow in the raw regional image 200, one or plural (e.g., several) preprocessing filters are applied to the image 200 for noise reduction and contrast enhancement. Two-dimensional, neighborhood-adaptive median and Wiener filters, for instance, are introduced to remove Gaussian and salt-and-pepper noise from the image 200. Median filters are commonly used in image processing edge detection applications, as they are capable of removing noise data with minimal smoothing effects. The Weiner filter utilized in inventive testing was tailored to behave as a moving block function that removes noise from the image, based upon the statistics of that neighborhood of pixels.

These filtering steps remove a large amount of noise from the image. For greater image contrast, the pixel intensity values are rescaled to span the entire range between 0 and 1. The filtered and re-contrasted image 300 is exemplified in FIGS. 4 and 5. The filtration and the contrast adjustment (e.g., contrast increase) yield an image 300, an image in which it is easier to distinguish between the jet particle 50 shadow and the background 75, thus facilitating the thresholding and mask-creation steps of inventive practice. With the cropped image of the jet particle ROI filtered and adjusted for optimum contrast, the particle 50 boundaries may be detected.

"Pixel" is a common technical term that came into being as a shortened expression for "picture element." Generally speaking, pixels are very small dots that make up electronic images such as those seen on televisions or computer displays. A typical electronic image (e.g., a graphic image on a computer screen) is divided into a matrix of thousands or millions of pixels. The electronic image is represented as a large two-dimensional array of brightness and/or color values for pixels.

A typical pixel matrix describes a two-dimensional grid of numerical values, each numerical value representing a single pixel. For instance, a computer display that has a resolution of 640×480 is constituted by 307,200 pixels, arranged in a matrix of 640 pixels (in the x-axis direction) by 480 pixels (in the y-axis direction); the number "640" denotes the number of columns of pixels, and the number "480" denotes the number of rows of pixels. Each pixel in a pixel matrix is characterized by an x-coordinate (specifying the pixel's place along the horizontal axis) and a y-coordinate (specifying the pixel's place along the vertical axis).

Terms such as "bitmap" and "pixmap" have been commonly used, sometimes interchangeably, to refer to a computer file format according to which a file contains a set of bits representing an electronic graphic image. Each pixel in a pixel matrix has corresponding thereto a bit, or group of bits, indicating the pixel's color and/or brightness. GIF, JPEG, and TIFF are examples of known image file types containing bitmaps or pixmaps. The terms "bitmap" and "pixmap" are defined synonymously and broadly herein as a computer file representative of an image and characterized by a matrix of pixels that constitute or are constituents of the image.

Figure 5:
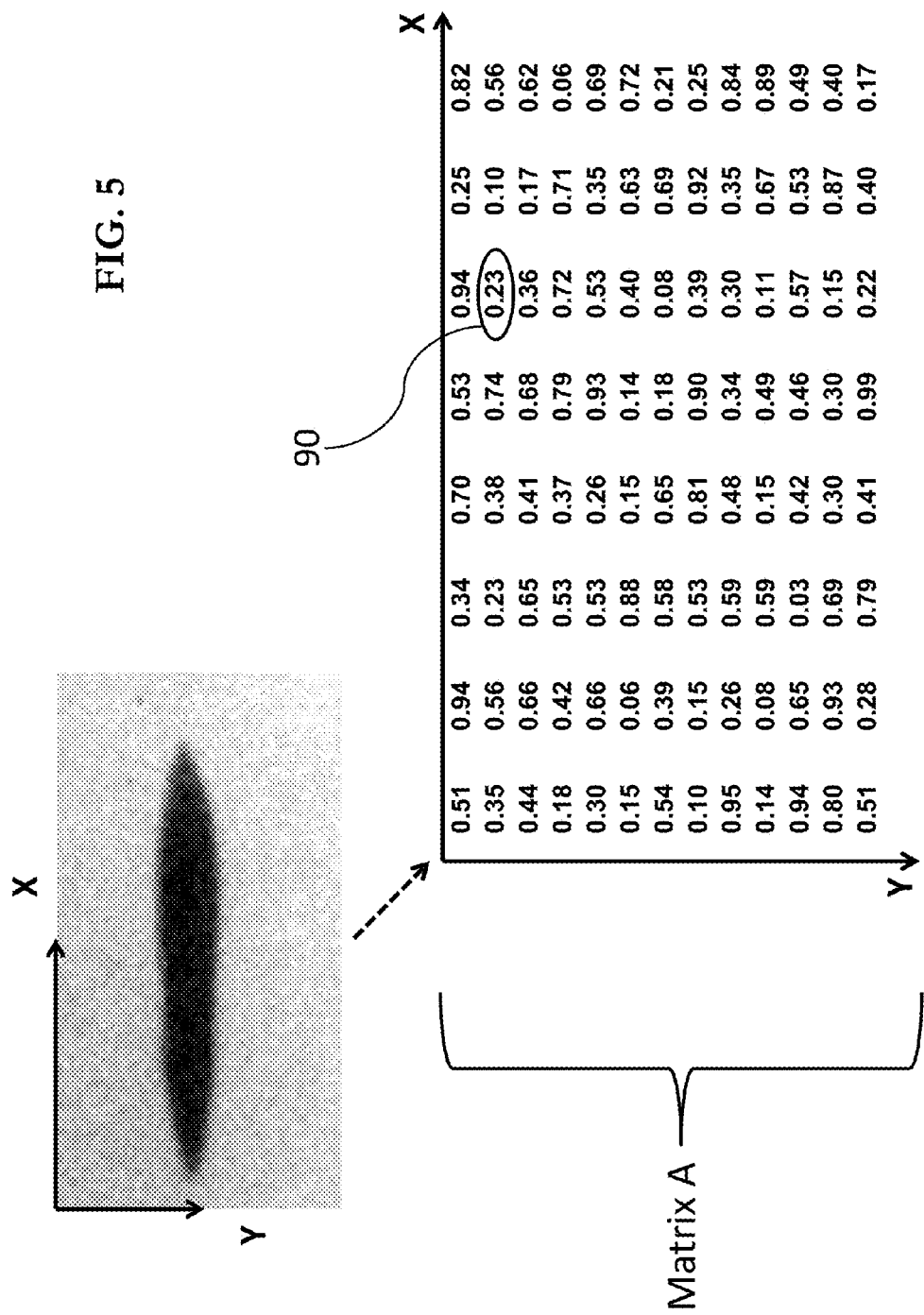
FIG. 5 is a schematic illustrating, by way of example, a matrix representation of the filtered, contrast-adjusted radiographic image shown in FIG. 4. The matrix shown in FIG. 5, designated Matrix "A," defines pixels in terms of numerical intensity (e.g., brightness) values in a continuous scale ranging between between zero (0) and one (1).

As illustrated in FIG. 5, the filtered and re-contrasted image 300 is describable in each of two forms, viz., pictorially (photographic image 300) and mathematically (Matrix A). Matrix A (e.g., a bitmap or pixmap) numerically represents, on a scale from zero to one, the corresponding pixel intensities of all of the pixels 90 in accordance with the x-axis (horizontal) and y-axis (vertical) locations of the pixels 90 in image 300. Each pixel is identified by an x-axis location and a y-axis location in the two-dimensional geometric plane; that is, each pixel is characterized by a pair of coordinates, viz., an x-coordinate and a y-coordinate, in the Cartesian coordinate system. For instance, the pixel that is fourth from the left in the x-axis direction and fifth from the top in the y-axis direction has a pixel intensity, in the range between zero and one, of 0.26.

Figure 6:
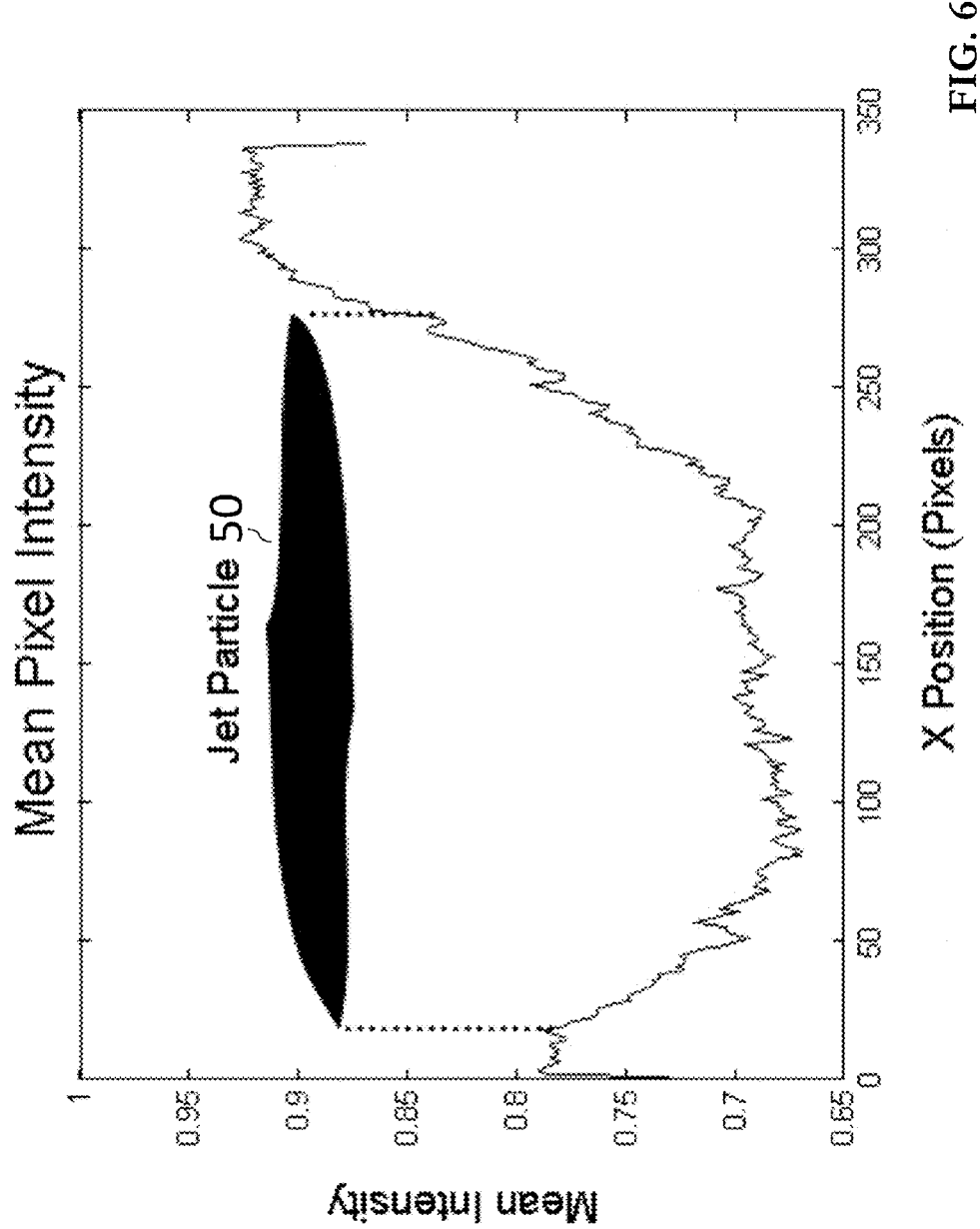
FIG. 6 is a graph illustrating, by way of example, a mathematical averaging technique that can be implemented in inventive practice in the determination of a binary computer image that corresponds to (e.g., is equivalent to) the radiographic image shown in FIG. 3.

With reference to FIG. 6, the respective mean intensities of the image matrix columns are calculated as a guide for the thresholding operations. FIG. 6 is a plot of jet image pixel intensities. As illustrated by FIG. 6, the approximate configuration and location of the jet particle are manifested by the plot of these mean intensity values, taken across the x-axis of the image shown in FIGS. 4 and 5. The presence of the particle shadow decreases the mean intensity in those areas. The average value of these mean intensities is calculated, and this becomes the initial value of the threshold pixel intensity. This procedure for ascertaining pixel intensity threshold is thus based on averaging columnar calculations of mean intensities. An equivalent procedure for ascertaining pixel intensity threshold is to simply average the corresponding intensities of all of the individual pixels.

Figure 7:
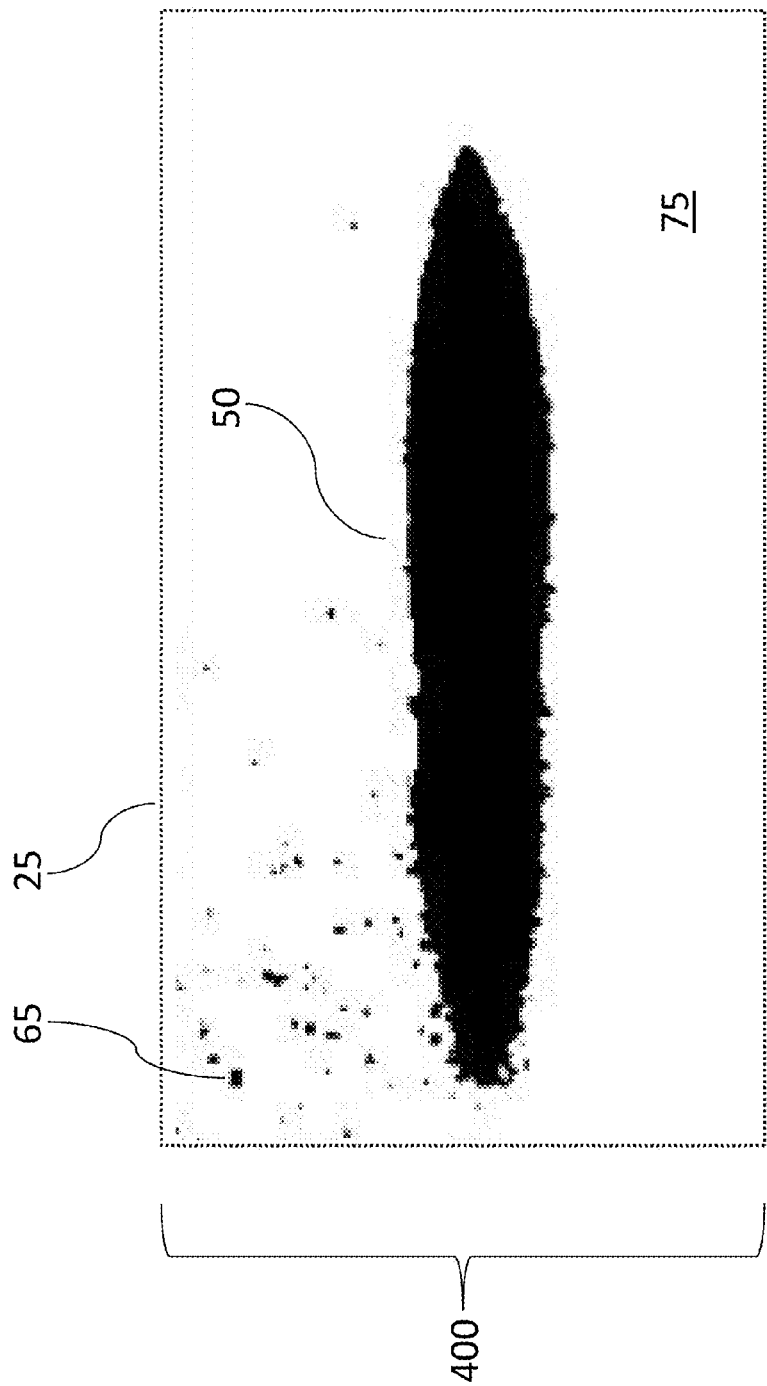
FIG. 7 is an example, in accordance with inventive practice, of a binary image that corresponds to the filtered, contrast-adjusted radiographic image shown in FIG. 4.

With reference to FIG. 7, a "zero" ("0") setting of a pixel 90 designates a black shade of the pixel. A "one" ("1") setting of a pixel 90 designates a white shade of the pixel. All pixels 90 that are below the threshold pixel intensity value are designated 0 (i.e., black), and all pixels 90 that are above the threshold pixel intensity value are designated 1 (i.e., white). The present invention can be practiced so that all pixels 90 that are equal to the threshold pixel intensity value are designated 1 (i.e., white), or, alternatively, so that all pixels 90 that are equal to the threshold pixel intensity value are designated 0 (i.e., black).

As shown in FIG. 7, this zero-or-one operation creates a binary mask 400 of the working image, in which all pixels are either "on" (i.e., white) or "off" (i.e., black). Note that, as shown in FIG. 7, a gradual decrease in background intensity may be seen from right to left in binary image 400, a decrease that may be attributable to a drop in x-ray beam intensity in accordance with increased distance from the x-ray source.

Figure 8:
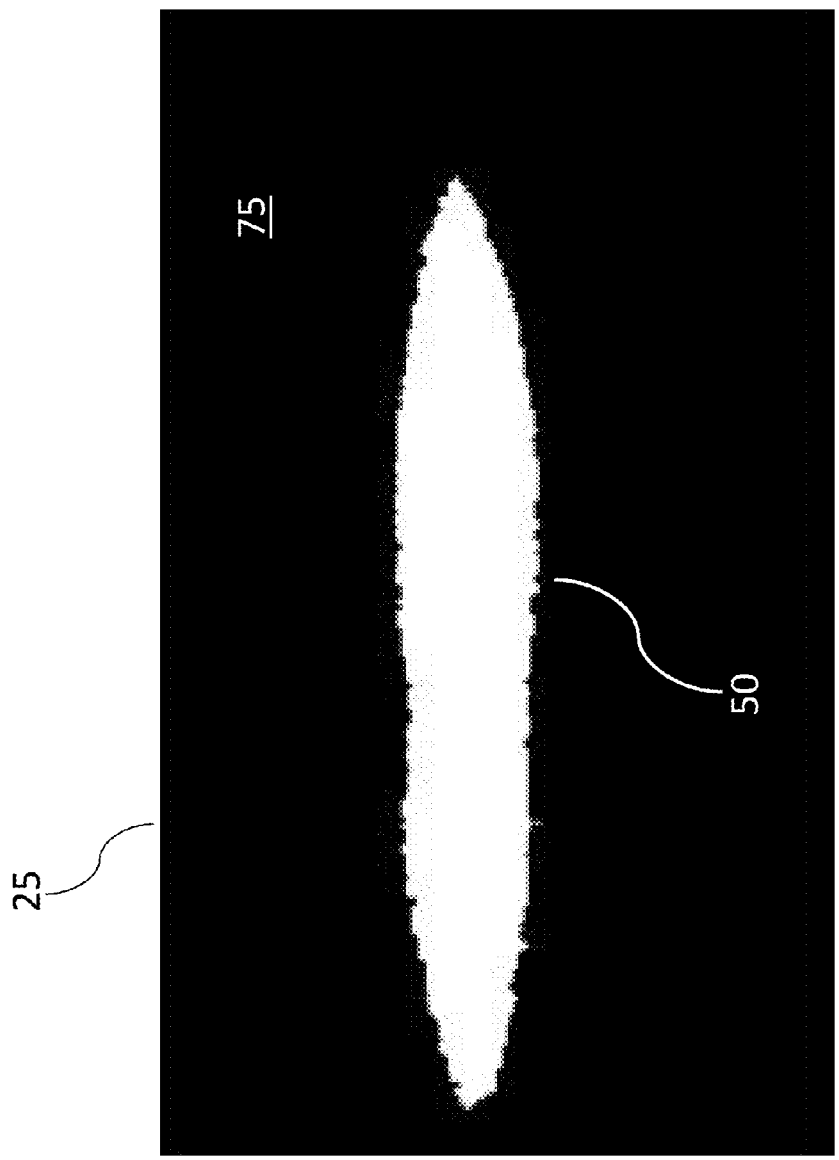
FIG. 8 is an example, in accordance with inventive practice, of an inverted binary computer image.
Figure 9:
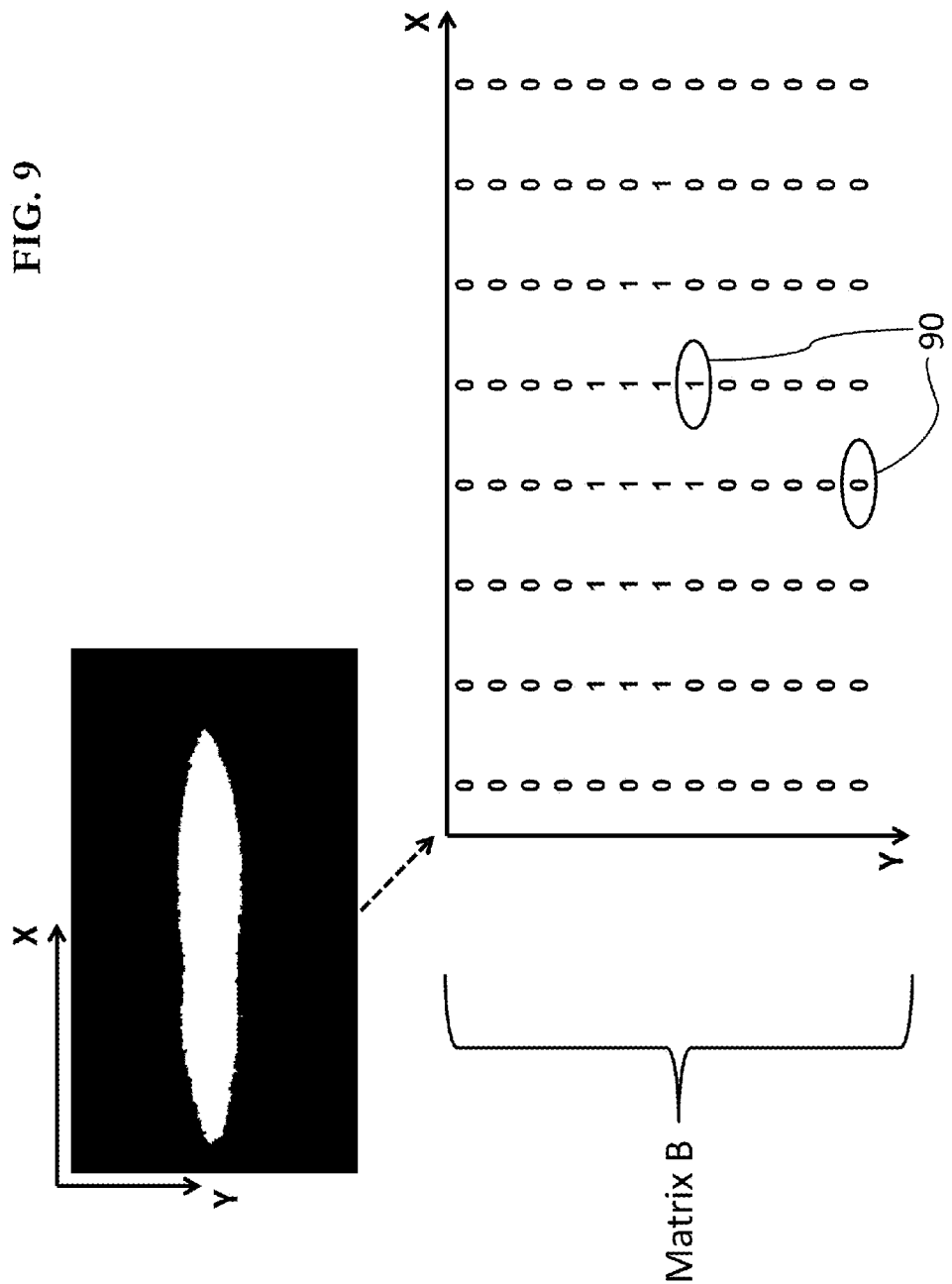
FIG. 9 is a schematic illustrating, by way of example, a matrix representation of the inverted, filtered binary image shown in FIG. 8. The matrix shown in FIG. 9, designated Matrix "B," defines pixels in terms of numerical intensity (e.g., brightness) values of either zero (0) or one (1).

With reference to FIGS. 8 and 9, the logical construct (containing zeroes and ones) of FIG. 7 is then inverted in order to turn the dark particle shadow 50 into an "on" object in the binary image. According to this inversion, all zeroes become ones, and all ones become zeroes. The inverted binary image is then passed through another filter to remove unwanted objects, in particular any objects below a certain pixel area size, such as those objects corresponding to noise 65 contained in image 400 (shown in FIG. 7). Resulting from the inversion and filtration of binary image 400 is image 500. Since the jet particle 50 should be the largest object in the image, any smaller objects are removed by filtering.

As shown in FIG. 9, inverted and filtered binary image 500 is defined as Matrix B (e.g., a bitmap or pixmap). For instance, the pixel that is fourth from the left in the x-axis direction and fifth from the top in the y-axis direction has a binary pixel intensity of 1. The pixel that is fourth from the left in the x-axis direction and ninth from the top in the y-axis direction has a binary pixel intensity of 0. As further explained hereinbelow, the adjacencies of 1-value pixels to 0-value pixels in Matrix B are key to the formulation of Matrix C, as the particle boundary is made up of boundary points each of which is a 1-value pixel that is adjacent to at least one 0-value pixel. For instance, in Matrix B, the above-noted 1-value pixel that is fourth from the left and fifth from the top is adjacent to three 0-value pixels.

Figure 4:
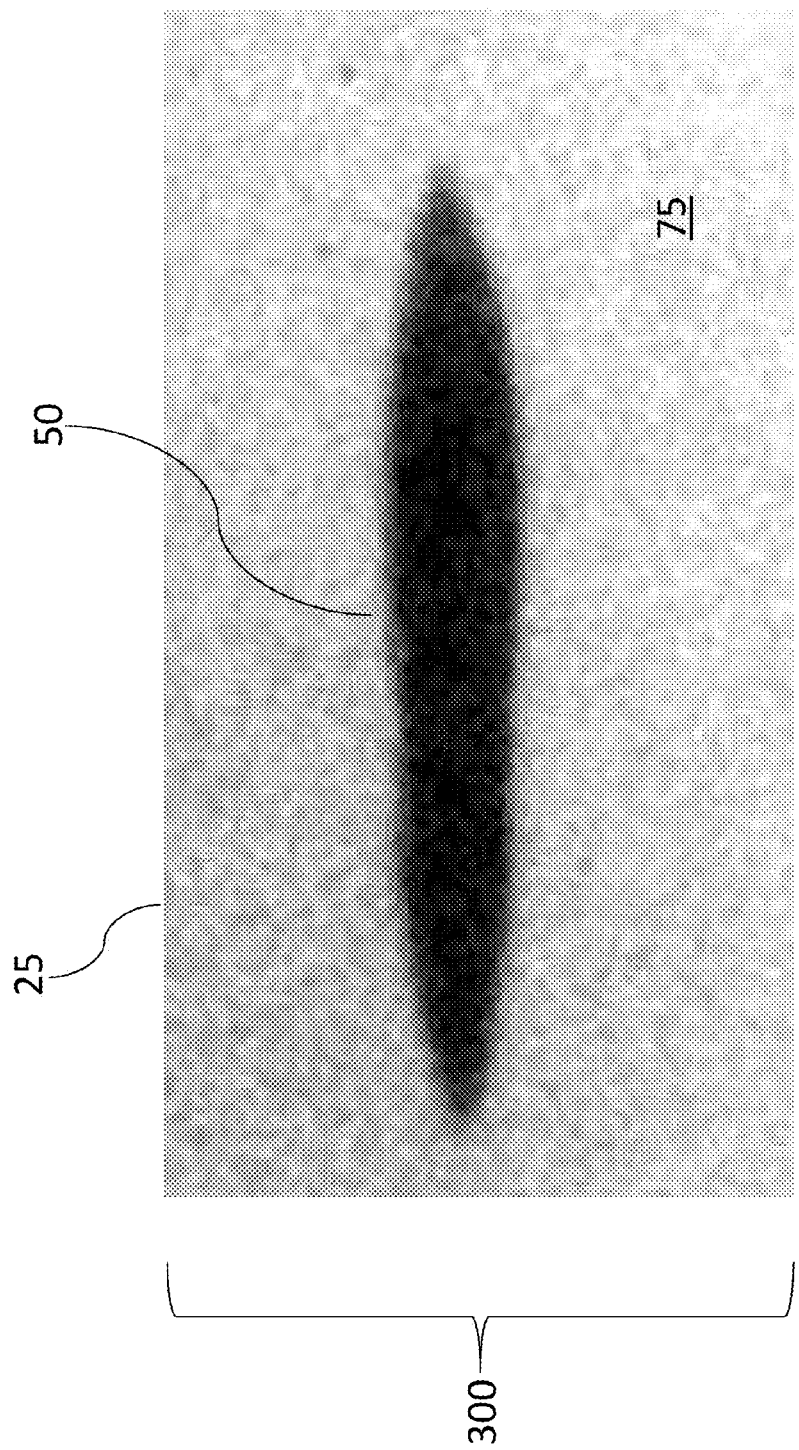
FIG. 4 is an example of a refined version of the radiographic image shown in FIG. 3, wherein the radiographic image shown in FIG. 3 has been filtered, and its pixel intensities adjusted for greater contrast.

Major processing steps of exemplary inventive practice are photographically illustrated in FIG. 3 (which shows raw image 200), FIG. 4 (which shows filtered, re-contrasted image 300), FIG. 7 (which shows binary image 400), and FIG. 8 (which shows inverted, filtered binary image 500). The raw image 200 of the shadow of the projected particle 50 is shown in FIG. 3. In FIG. 4, the filtered and contrast-adjusted image 300 is shown, ready for further processing. In FIG. 7, the image has been converted to a binary mask image 400, using a pre-set threshold value of pixel intensity. In FIG. 8, the binary mask has been inverted, and all noise objects have been removed. The resultant image—i.e., the inverted, filtered, binary image shown in FIG. 8—is a clean and informative representation of the jet element 50.

Figure 10:
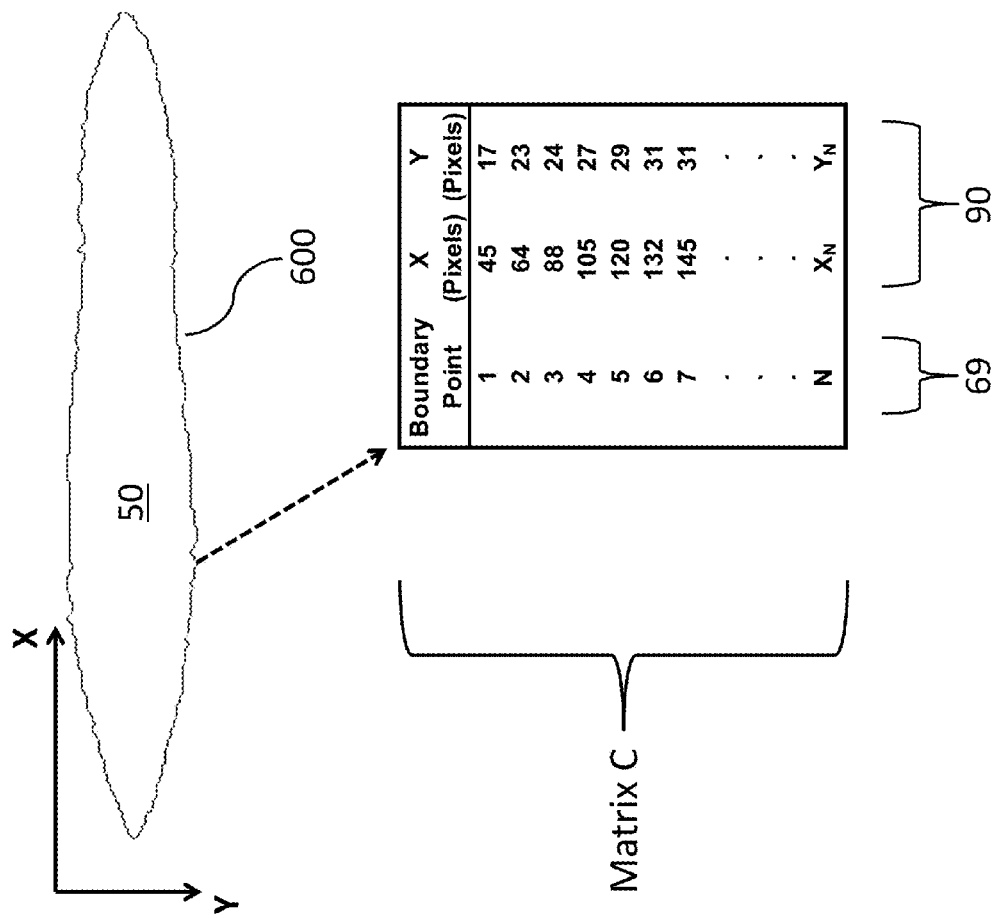
FIG. 10 is a schematic illustrating, by way of example, a graphic representation and a matrix representation of the perimeter of the subject shaped charge jet particle. The jet particle's perimeter is graphically displayed as a closed planar figure. The matrix shown in FIG. 10, designated Matrix "C," was determined based on adjacencies of "1"-intensity pixels and "0"-intensity pixels in the inverted, filtered binary image shown in FIG. 8.

Particle 50's boundary 600, depicted in FIG. 10 as a closed curved two-dimensional geometric figure, is the perimeter of particle 50 as derived from image 500. Boundary 600 is manifested by the interfaces of the 0's and 1's in Matrix B, and the coordinates of these interfaces are stored in a matrix of boundary points, viz., Matrix C (e.g., a bitmap or pixmap). As shown in FIG. 10, each boundary point 69 is a pixel 60 characterized by a pair of coordinates, i.e., an x-axis coordinate and a y-axis coordinate. For instance, boundary point serial number "1" is constituted by the pixel located in the 45$^{th}$ place of Matrix B in the x-axis direction, and in the 17$^{th}$ place of Matrix B in the y-axis direction.

As described in this example, Matrix C is derived directly from Matrix B, which defines the inverted and filtered binary image 500. The source image is converted to a binary image, the binary image is converted to an inverted binary image, and the boundary matrix (e.g., Matrix C) is derived directly from the inverted binary image matrix (e.g., Matrix B). Alternatively, the present invention can be practiced whereby inversion of the binary image (e.g., binary image 400) is not performed. The source image is converted to a non-inverted binary image, and the boundary matrix (e.g., Matrix C) is derived directly from a non-inverted binary image matrix (e.g., a matrix that corresponds to binary image 400 shown in FIG. 7). The inventive principle is essentially the same, regardless of whether the immediate basis for determining the boundary is a non-inverted binary image or an inverted binary image. That is, the boundary is delineated by adjacencies between one-pixels and zero-pixels in a binary image.

Matrix B is a matrix representation of inverted and filtered binary image 500. The inventive practitioner uses Matrix B to construct Matrix C. In Matrix B, the inventive practitioner finds every binary-one pixel 90 that is next to a binary-zero pixel 90; the inventive practitioner indicates each of these interfacial binary-one pixels 90 in Matrix C. Each interfacial binary-one pixel 90 represents a boundary point 69, lying in the boundary 600 of jet particle 50; hence, these interfacial binary-one pixels 90 are boundary points 69 that collectively or aggregately define boundary 600. Since jet particle 50 is the only object in image 500, the boundary (edge) 600 of particle 50 can be detected straightforwardly.

Figure 11:
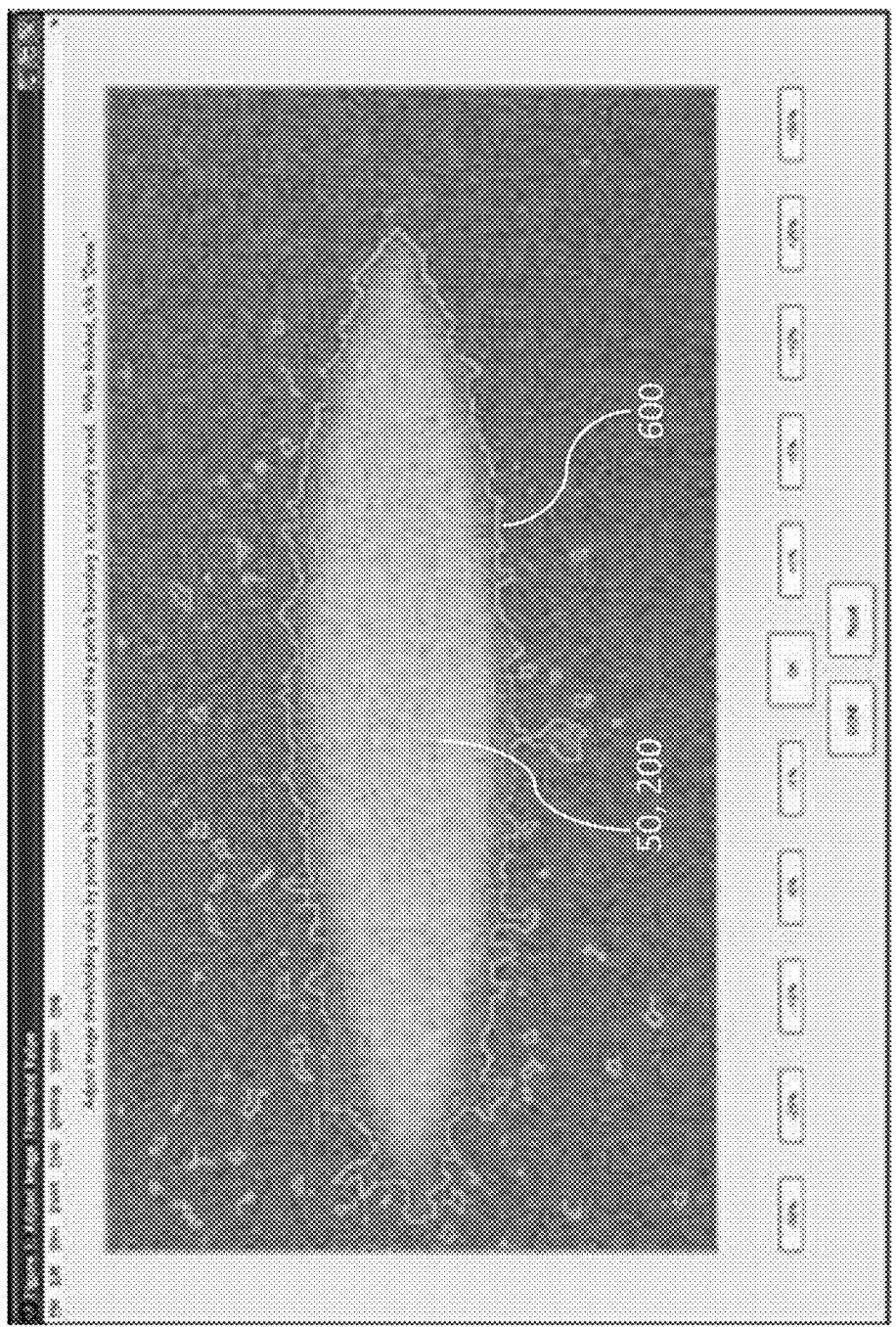
FIG. 11 is an example of a screenshot portraying superimposition, in accordance with the present invention for comparative purposes, of a perimeter of the kind shown in FIG. 10 with respect to a raw radiographic image of the kind shown in FIG. 3.
Figure 12:
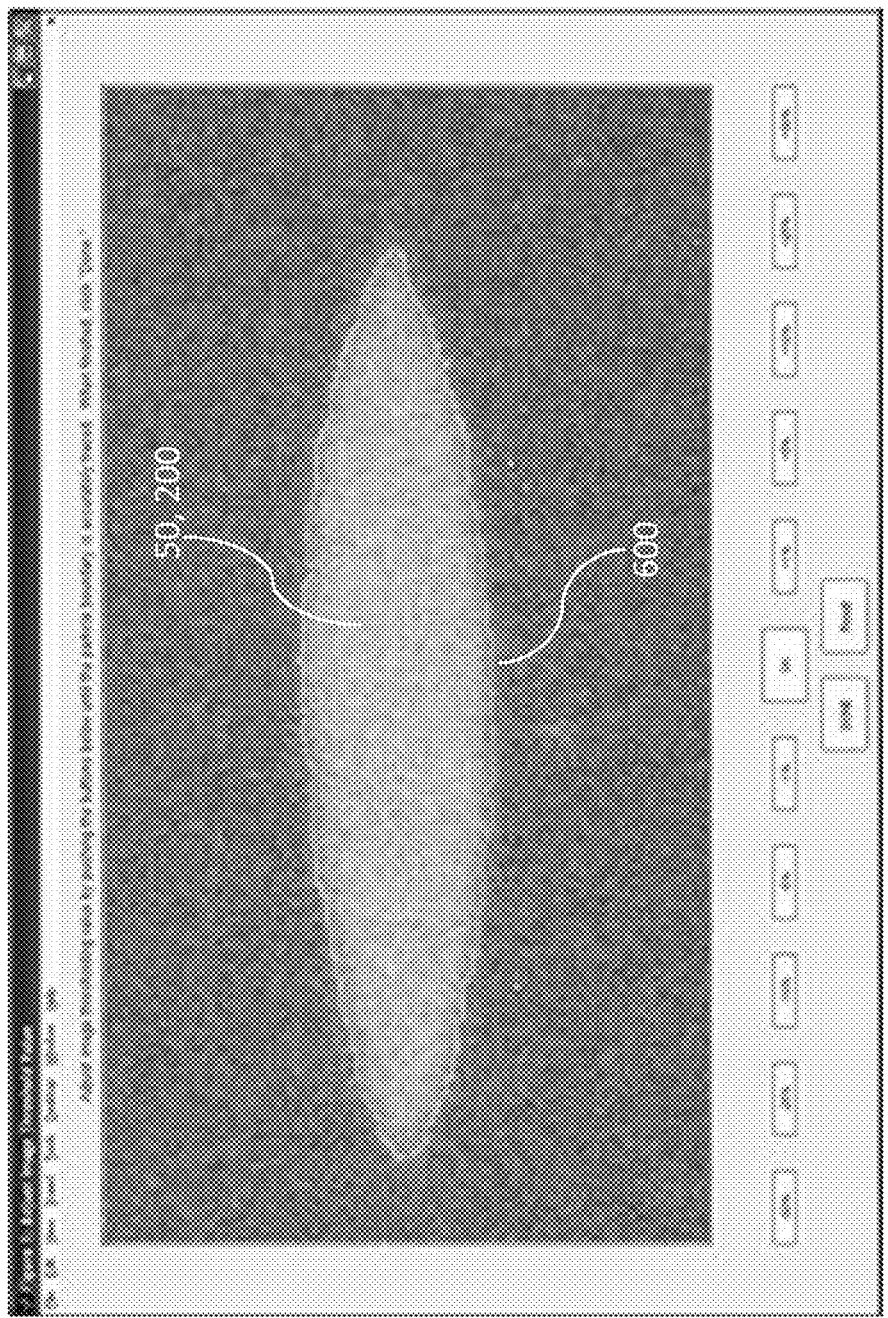
FIG. 12 is an example of a screenshot portraying superimposition, in accordance with the present invention for comparative purposes, of a different perimeter of the kind shown in FIG. 10 with respect to a raw radiographic image of the kind shown in FIG. 3.

With reference to FIGS. 11 and 12, for visual verification that the inventive code (e.g., AJAX) has identified the correct particle boundary 600, the stored boundary points are mapped onto the original region-of-interest (ROI) image 200. The present invention's AJAX program then provides for the user's adjustment of the pixel intensity threshold value by incremental percentages, thereby adjusting the configuration and location of the mapped particle boundary.

FIG. 11 illustrates insufficient comportment of boundary 600a with the particle 50 of image 200 (shown in FIG. 3). FIG. 12 illustrates sufficient comportment of boundary 600b with the same particle 50 of image 200. Boundary 600b is a boundary that has been reconfigured, via adjustment of the pixel intensity threshold value, vis-à-vis boundary 600a. Once the particle boundary 600 satisfactorily matches the original (unprocessed or largely unprocessed) regional particle image 200, the binary mask associated with that boundary set 600 is saved for further calculations. This visual verification process can be repeated for each of the other jet particle boundaries 600, until all jet particle boundaries 600 have been successfully identified.

Upon inventive detection of a jet particle boundary 600, all points 69 on that boundary 600 are stored for volume and mass calculations. The entire boundary 600 of the jet particle 50 is utilized, according to exemplary embodiments of the present invention; this represents a vast improvement over previous methods, which track fewer digitized points. The inventive methodology yields a far more accurate particle volume approximation, as the true contours of the jet particle's shape are not distorted by line segment estimations. This is especially important when dealing with shaped charges with non-uniform or oddly shaped particles, such as associated with certain kinds of explosive weapons, e.g., explosively formed penetrators (EFPs). Regardless of whether the jet particle is normally shaped or abnormally shaped, the present invention can account for the entire boundary and area presented, better capturing volume and mass statistics than previous methods would be capable of.

Inventive practice thus more accurately tracks particle boundary points, and another benefit of this is seen in velocity calculations. The present invention allows the user to specify the number of points to track ($\lambda$), which results in 2($\lambda$+2) total velocity measurements for each jet particle. The AJAX computer program prototype was written by the present inventors so that handling hundreds of data points requires almost no increase in computation time, but results in much higher measurement accuracy. Not only can the particle axial velocity be averaged over many more points, but the additional $\lambda$ points provide much more insight as to the transverse and rotational velocities, as well. This information can be crucial to developing improved constitutive models describing shaped charge jet flight.

Exemplary embodiments of the present invention work with binary images and matrices in MATLAB. The present invention's utilization of MATLAB is beneficial for several reasons. The properties of the "on" pixels can easily be calculated by analyzing the number and distribution of the 1's and 0's in the matrix. For instance, calculating the relative size of each jet particle is a simple operation that involves counting the total number of 1's. This provides the total number of pixels in the particle, which can then be converted into an area using the image scale that was previously determined. It is by this simple logic that several important geometric statistics can be gathered for each contiguous jet object, including the area, mass center or centroid, length, diameter, and orientation relative to the local coordinate system.

In contrast to the present invention's methodology, typical methods found in literature appear to effect summations of segment volumes to approximate jet particle characteristics. These previous approaches assume that each segment may be rotated about a particle's axis of symmetry by half a rotation, to form half of a truncated cylinder. The segments on the other side of the axis of symmetry are treated by previous methods in the same manner, until a full three-dimensional jet particle is formed. The number of particle segments and their spacing are determined by the number of particle boundary loci points. Almost all of the work that has been previously conducted in this area uses this volume approximation.

By comparison, the present invention's AJAX program can compute and track hundreds of particle boundary 600 loci points with a relatively small increase in computation time, resulting in a smoother profile and a more accurate representation of the jet particle 50. All loci points are spaced evenly from one another, separated by the constant angle $\gamma=2\pi/\lambda$. Since AJAX's area calculation procedure accounts for all pixels in the image and does not approximate with line segments, the inventive method is likely to be more accurate than previous methods.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for processing a photographic image, the method comprising:
    defining a first photographic image, said first photographic image characterized by multiple pixels and including depiction of an object, said defining of said first photographic image including formulating a first pixel matrix, said first pixel matrix representing pixels having pixel intensities in a spectrum between black pixels and white pixels;
    defining a second photographic image, said second photographic image characterized by said multiple pixels and including depiction of said object, said defining of said second photographic image including formulating a second pixel matrix, said second pixel matrix representing black pixels and white pixels, said formulating of said second pixel matrix including establishing a threshold pixel intensity for designating each pixel in said first pixel matrix as either a black pixel or a white pixel in said second pixel matrix;
    delineating a boundary of said object, said delineating including formulating a third pixel matrix, said third pixel matrix representing pixels located at interfaces between white pixels and black pixels in said second pixel matrix;
    comparing the delineated said boundary of said object to said object depicted in said second photographic image;
    repeating, at least once, said defining of said second photographic image, said delineating of said boundary of said object, and said comparing of the delineated said boundary of said object to said object depicted in said second photographic image, wherein in each said repetition a different said threshold pixel intensity is established in performing said defining of said second photographic image.

2. The method of claim 1, wherein said third pixel matrix represents black pixels that are contiguous to white pixels.

3. The method of claim 1, wherein said third pixel matrix represents white pixels that are contiguous to black pixels.

4. A computer program product for performing photographic processing, the computer program product comprising a non-transitory computer-readable storage medium having computer-readable program code portions stored therein for execution by a computer, the computer-readable program code portions including:
    a first executable program code portion, for describing a varying-intensity photographic matrix, said varying-intensity photographic matrix representing pixels having pixel intensities varying in a range between black pixel intensity and white pixel intensity;
    a second executable program code portion, for describing a binary-intensity photographic matrix, said describing of said binary-intensity photographic matrix being performed based on said varying-intensity photographic matrix, said binary-intensity photographic matrix representing the pixels of said varying-intensity matrix as having two pixel intensities, said two pixel intensities being black pixel intensity and white pixel intensity, said describing of said binary-intensity photographic matrix including setting a threshold pixel intensity for converting each of said varying pixel intensities of said varying-intensity matrix to either black pixel intensity or white pixel intensity;
    a third executable program code portion, for describing a geometric photographic matrix, said describing of said geometric photographic matrix being performed based on said binary-intensity photographic matrix, said geometric photographic matrix representing some of said pixels of said binary-intensity matrix, said describing of said geometric photographic matrix including finding adjacencies between said white pixels and said black pixels of said binary-intensity photographic matrix so as to delimit a geometric figure.

5. The computer program product of claim 4, wherein said geometric figure is delimited by said black pixels.

6. The computer program product of claim 4, wherein said geometric figure is delimited by said white pixels.

7. The computer program product of claim 4, the computer-readable program code portions including:
    a fourth executable program code portion, for providing a varying-intensity photographic image, said varying-intensity photographic image corresponding to said varying-intensity photographic matrix;
    a fifth executable program code portion, for providing a geometric photographic image, said varying-intensity photographic image corresponding to said geometric photographic matrix;
    a sixth executable program code portion, for enabling combined display of said geometric photographic image and said varying-intensity photographic image, thereby facilitating visual comparison, by a user, of said geometric photographic image to said varying-intensity photographic image.

8. The computer program product of claim 7, further comprising a seventh executable program code portion, for performing at least one additional iteration of the steps including describing said binary-intensity photographic matrix, describing said geometric photographic matrix, providing said geometric photographic image, and comparing said geometric photographic image to said varying-intensity photographic image, wherein in each said iteration a different said threshold pixel intensity is set in performing said describing of said binary-intensity photographic matrix.

9. An apparatus comprising a computer having computer code characterized by computer program logic for enabling said computer to process a photographic image, said computer code being executable by said computer so that, in accordance with said computer program logic, said computer performs acts including:

obtaining a multi-intensity photographic image, said multi-intensity photographic image portraying an object and having multiple pixels of variegated pixel intensity values;

based on said multi-intensity photographic image, obtaining a bi-intensity radiographic image, said bi-intensity photographic image portraying said object and having multiple pixels of two opposite pixel intensity values, said obtaining of said bi-intensity photographic image including calculating a threshold pixel intensity value and applying the calculated said threshold pixel intensity value to said multi-intensity photographic image so as to attribute each pixel in said multi-intensity photographic image with one of the two said opposite pixel intensity values;

based on said bi-intensity photographic image, obtaining a perimetric delineation of said object, said obtaining of said perimetric delineation of said object including tracing said pixels in said bi-intensity photographic image each of which is adjacent to at least one said pixel attributed with the opposite said pixel intensity value;

wherein said obtaining of said bi-intensity photographic image includes adjusting a previous bi-intensity photographic image, said adjusting of said previous bi-intensity photographic image including at least one of:

filtering said previous bi-intensity photographic image;

reversing the contrast of said previous bi-intensity photographic image.

10. The apparatus of claim 9, wherein said two opposite pixel intensity values of said multi-intensity photographic image are black and white, and wherein said pixels that are traced in said bi-intensity photographic image are white said pixels, each said white pixel being adjacent to a black said pixel.

11. The apparatus of claim 9, wherein said two opposite pixel intensity values of said multi-intensity photographic image are black and white, and wherein said pixels that are traced in said bi-intensity photographic image are black said pixels, each said black pixel being adjacent to a white said pixel.

12. The apparatus of claim 9, wherein said obtaining of said multi-intensity photographic image includes adjusting a previous multi-intensity photographic image, said adjusting of said previous multi-intensity photographic image including at least one of:

filtering said previous multi-intensity photographic image;

increasing the contrast of said previous multi-intensity photographic image.

13. The apparatus of claim 9, wherein said computer code is executable by said computer so that, in accordance with said computer program logic, said computer performs acts further including obtaining a comparative representation, said comparative representation facilitating comparison of said perimetric delineation of said object vis-à-vis said object as portrayed in said multi-intensity photographic image.

14. The apparatus of claim 13, wherein said computer code is executable by said computer so that, in accordance with said computer program logic, said computer performs acts further including repeating, at least once, the following steps:

said obtaining of said bi-intensity radiographic image;

said obtaining of said perimetric delineation of said object;

said obtaining of said comparative representation.

15. The apparatus of claim 14, wherein in each said repetition a different said threshold pixel intensity value is calculated in said obtaining of said bi-intensity radiographic image.

16. The apparatus of claim 15, wherein said obtaining of said multi-intensity photographic image includes adjusting a previous multi-intensity photographic image, said adjusting of said previous multi-intensity photographic image including at least one of:

filtering said previous multi-intensity photographic image;

increasing the contrast of said previous multi-intensity photographic image.

17. The apparatus of claim 15, wherein said obtaining of said bi-intensity photographic image includes adjusting a previous bi-intensity photographic image, said adjusting of said previous bi-intensity photographic image including at least one of:

filtering said previous bi-intensity photographic image;

reversing the contrast of said previous bi-intensity photographic image.

\* \* \* \* \*